(12) United States Patent
Miyamoto

(10) Patent No.: US 12,548,148 B2
(45) Date of Patent: Feb. 10, 2026

(54) MEDICAL IMAGE PROCESSING APPARATUS, MEDICAL IMAGE PROCESSING METHOD, AND STORAGE MEDIUM

(71) Applicant: CANON KABUSHIKI KAISHA, Tokyo (JP)

(72) Inventor: Hideaki Miyamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 17/935,836

(22) Filed: Sep. 27, 2022

(65) Prior Publication Data

US 2023/0107439 A1 Apr. 6, 2023

(30) Foreign Application Priority Data

Oct. 1, 2021 (JP) .................. 2021-162902

(51) Int. Cl.
*G06T 7/00* (2017.01)

(52) U.S. Cl.
CPC .. *G06T 7/0012* (2013.01); *G06T 2207/20081* (2013.01); *G06T 2207/30004* (2013.01)

(58) Field of Classification Search
CPC ......... G06T 7/0012; G06T 2207/20081; G06T 2207/30004

USPC .......................................................... 382/128
See application file for complete search history.

(56) References Cited

U.S. PATENT DOCUMENTS

| 2016/0116559 | A1* | 4/2016 | Cohen ................ G01R 33/5614 324/309 |
| 2019/0347772 | A1* | 11/2019 | Zhang ....................... G06T 5/60 |
| 2020/0335202 | A1* | 10/2020 | Kawagishi ............. G06V 10/25 |
| 2022/0067986 | A1* | 3/2022 | Takeshima .......... G01R 33/5608 |

FOREIGN PATENT DOCUMENTS

| JP | 2009125137 A | 6/2009 |
| JP | 2015173804 A | 10/2015 |
| JP | 2019010510 A | 1/2019 |

* cited by examiner

*Primary Examiner* — Gabriel I Garcia
(74) *Attorney, Agent, or Firm* — Canon U.S.A., Inc. IP Division

(57) ABSTRACT

A medical image processing apparatus includes an obtaining unit configured to obtain a medical image based on imaging order information, and a determination unit configured to determine, using parameters obtained by machine learning, consistency between the imaging order information and the medical image.

18 Claims, 10 Drawing Sheets

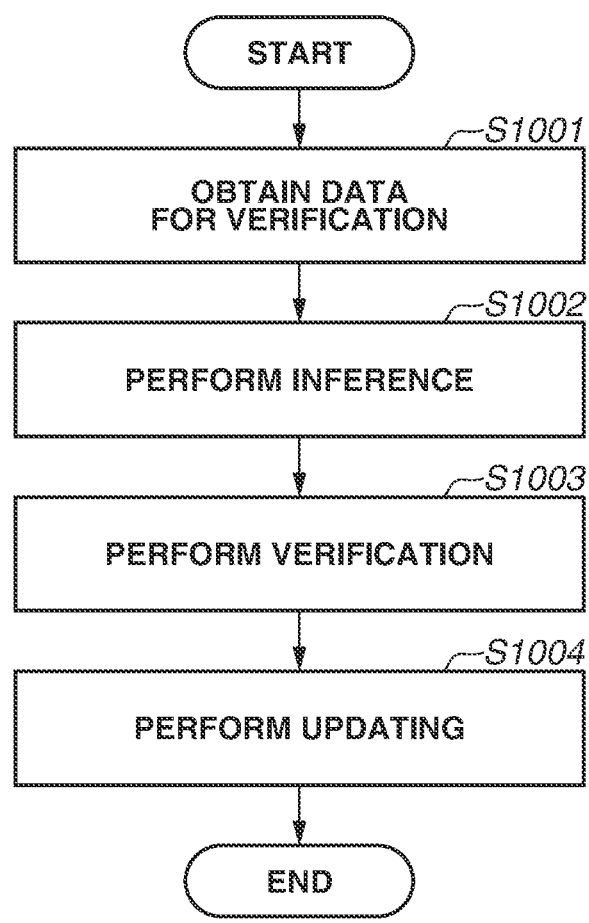

MEDICAL IMAGE PROCESSING APPARATUS, MEDICAL IMAGE PROCESSING METHOD, AND STORAGE MEDIUM

BACKGROUND

Field of the Disclosure

The present disclosure relates to a medical image processing apparatus, a medical image processing method, and a storage medium.

Description of the Related Art

In the field of medicine, digitalization of medical images obtained by capturing images of patients has been implemented. For example, examinations on patients using medical image processing systems (modalities), such as an X-ray examination apparatus, a computed tomography (CT) apparatus, and a magnetic resonance imaging (MRI) apparatus, are conducted based on imaging order information via an information management apparatus. Medical images obtained by imaging are digitized and the digitized medical images are stored and managed together with additional information, such as patient information and examination information, in an image server.

The medical images and additional information are managed on a network that connects the modalities and the image server, so that, for example, any correction made on information in either the modalities or the image server needs to be managed to maintain the consistency of the information therebetween. In relation to this, Japanese Patent Application Laid-Open No. 2009-125137 discusses a method for updating additional information added to a medical image with new information and reflecting the updated information in an image server so as to manage the inconsistency in additional information that is caused when information is updated in one of the image server and a client terminal.

SUMMARY

A medical image processing apparatus includes an obtaining unit configured to obtain a medical image based on imaging order information, and a determination unit configured to determine, using parameters obtained by machine learning, consistency between the imaging order information and the medical image.

Further features of various embodiments will become apparent from the following description of exemplary embodiments with reference to the attached drawings.

BRIEF DESCRIPTION OF THE DRAWINGS

FIG. 10 is a flowchart illustrating a processing procedure according to a fifth exemplary embodiment.

DESCRIPTION OF THE EMBODIMENTS

For example, a medical image processing system for use in the field of medicine needs to be operated by a technician specializing in operating the medical image processing system. The technician who obtains medical images may not be the same person as a doctor who conducts an examination using medical images.

For example, the technician operates the medical image processing system based on a request (order) from the doctor who has examined a patient to collect medical images, perform image processing on the medical images, and transfer the medical images to a server. In this case, for example, if there is inconsistency between the order and obtained medical images, the workflow can be impaired by re-obtaining medical images. In some cases, the inconsistency therebetween can be noticed only after the patient has gone home.

One aspect of an exemplary embodiment is to accurately determine consistency between imaging order information (imaging information that has been ordered by a health-care provider, such as a doctor) and a medical image obtained based on the imaging order information.

To solve the above-described issues, a medical image processing apparatus according to an aspect of the present exemplary embodiment includes an image obtaining unit configured to obtain a medical image based on imaging order information, and a determination unit configured to determine consistency between the imaging order information and the medical image using a parameter obtained by machine learning.

The medical image processing apparatus according to the present exemplary embodiment can accurately determine consistency between imaging order information and a medical image obtained based on the imaging order information.

Exemplary embodiments will be described below with reference to the drawings. While the following exemplary embodiments are described using an example where a medical image processing system for radiological imaging is used, some embodiments are applicable to medical image processing systems using other modalities, such as a computed tomography (CT) apparatus, a magnetic resonance imaging (MRI) apparatus, and an ultrasonic apparatus. Some embodiments are also applicable to medical image processing systems using a combination of various types of modalities.

Outline Configuration

Figure 1:
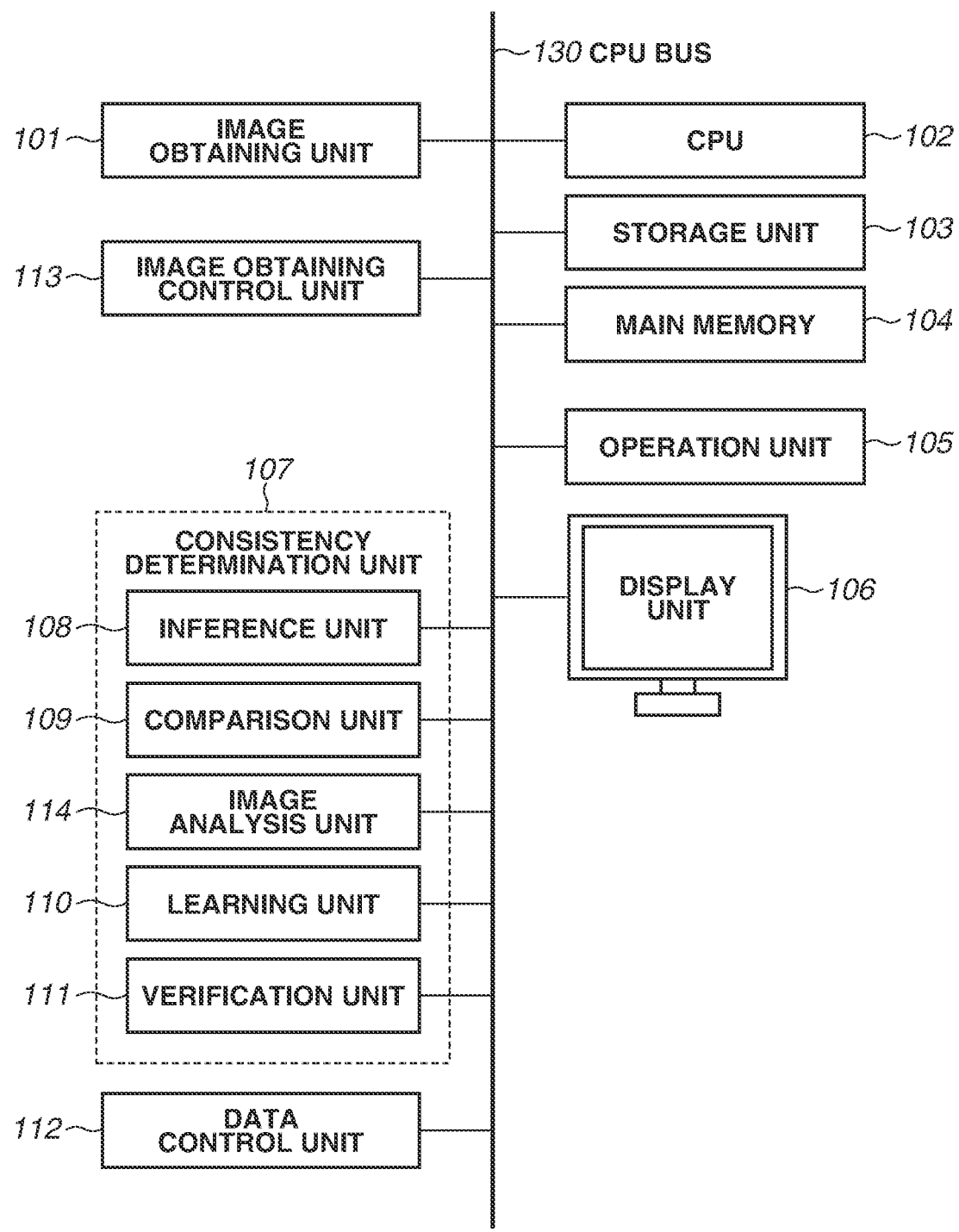
FIG. 1 is a block diagram illustrating a schematic configuration of a medical image processing apparatus according to an exemplary embodiment.

Some embodiments are applied to, for example, a medical image processing apparatus 100 illustrated in FIG. 1. The medical image processing apparatus 100 includes an image obtaining unit 101, a central processing unit (CPU) 102, a storage unit 103, a main memory 104, an operation unit 105, a display unit 106, and a consistency determination unit 107. The image obtaining unit 101, the CPU 102, the storage unit 103, the main memory 104, the operation unit 105, the display unit 106, and the consistency determination unit 107 are connected to each other via a CPU bus 130 and are configured to mutually transmit and receive data therebetween.

In the medical image processing apparatus 100, the main memory 104 functions as a working memory used for processing in the CPU 102. The CPU 102 controls the overall operation of the medical image processing apparatus 100 using the main memory 104 in accordance with an operation input via the operation unit 105 and parameters stored in the storage unit 103. With this configuration, the medical image processing apparatus 100 operates as follows.

First, when an imaging instruction is input by a user using the operation unit 105 based on imaging order information transmitted from an information management system (not illustrated), the CPU 102 transmits this imaging instruction to the image obtaining unit 101. Examples of an information management system used in a hospital include a hospital information system (HIS) that manages information including patient information, such as a patient name and a patient identification (ID), and examination request information including a date and time of an examination and imaging content. Examples of the information management system include a radiology information system (RIS) that manages information, such as patient information and examination request information, particularly, in a radiology department. The term "imaging order information" refers to a unit of information about an examination ordered by a doctor, and includes patient information, a (scheduled) date and time of imaging, a designated examination method (X-ray examination, CT examination, etc.), and an area, a direction, and an orientation of an imaging target based on doctor's findings.

An example where an X-ray examination is designated as an examination method ordered by a doctor will be described below. In this case, the medical image processing apparatus 100 is an X-ray diagnostic apparatus and the image obtaining unit 101 is an X-ray image obtaining unit. The imaging order information includes information used for X-ray imaging, such as the type (upright type, lying type, portable type, etc.) of an X-ray detection apparatus used for imaging, the orientation (imaging area, direction, etc.) of a patient, and X-ray imaging conditions (tube voltage, tube current, and presence or absence of a grid, etc.).

Upon receiving the imaging instruction, the image obtaining unit 101 controls a radiation generation unit and a radiation detector to execute radiographic imaging. In radiographic imaging, the radiation detector first detects a radiation beam that is irradiated from the radiation generation unit and is transmitted through a subject while being attenuated, and the image obtaining unit 101 obtains a signal corresponding to the intensity of the radiation beam as image data. The image data is sequentially transferred to the main memory 104 and the consistency determination unit 107 via the CPU bus 130.

The consistency determination unit 107 inputs the transferred image data to an inference unit 108, outputs a result of inference processing, and determines consistency between the imaging order information and the image data based on the inference result.

Specifically, for example, in the case of determining the consistency on the imaging area included in the imaging order information, the inference unit 108 performs inference processing on the imaging area based on the image data, and the consistency determination unit 107 determines whether the inferred imaging area matches information on the imaging area included in the imaging order information.

While the imaging area is described above as an example of the imaging order information, the imaging order information on which the consistency determination unit 107 performs determination is not limited to the imaging area. The consistency determination unit 107 may determine the consistency with respect to one or more pieces of information. The imaging order information, the image data, and the inference processing result are transferred to, for example, the storage unit 103 and the display unit 106 via the CPU bus 130. The storage unit 103 stores the transferred imaging order information and the image data based on the inference processing result. The display unit 106 displays information based on the transferred imaging order information, image data, and inference processing result. Display of information on the display unit 106 is performed by a display control unit (not illustrated) included in the medical image processing apparatus 100. In other words, the display control unit corresponds to an example of a display control unit that displays a determination result output from the determination unit and an instruction for an operator based on the determination result on the display unit 106.

The user checks the information that is based on the displayed imaging order information, image data, and inference processing result, and issues an operation instruction, as needed, via the operation unit 105.

The consistency determination unit 107 further includes a comparison unit 109 that performs consistency determination processing using a rule-based comparison algorithm.

The consistency determination unit 107 further includes a learning unit 110 and a verification unit 111. The learning unit 110 updates parameters for the inference unit 108. The verification unit 111 verifies the accuracy of inference using the parameters. The medical image processing apparatus 100 further includes a data control unit 112 that controls operations of the learning unit 110 and the verification unit 111.

Figure 2:
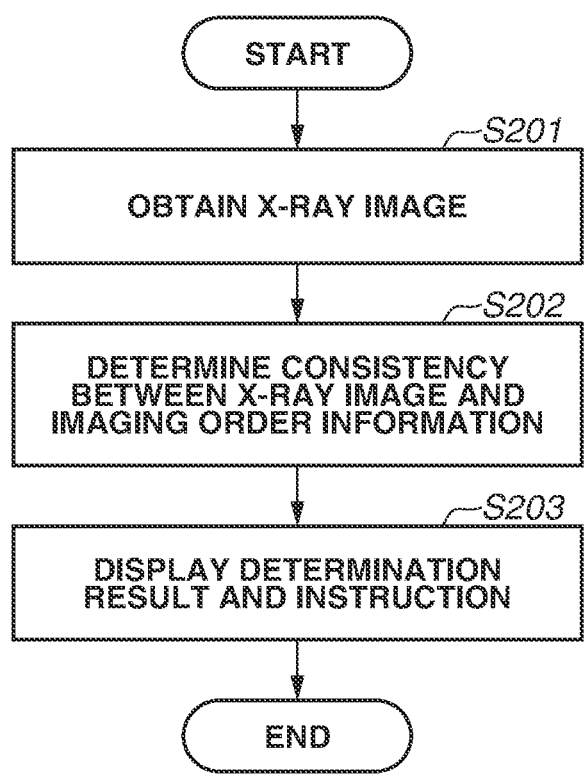
FIG. 2 is a flowchart illustrating a processing procedure according to a first exemplary embodiment.

As a first exemplary embodiment, a description will be given of a case where X-ray imaging is performed using the X-ray diagnostic apparatus based on imaging order information to determine consistency between an obtained X-ray image and the imaging order information, and if there is inconsistency between the X-ray image and the imaging order information, an alert is issued, with reference to FIG. 2.

Processing Flow

In step S201, the image obtaining unit 101 obtains an X-ray image based on information that is derived from the transmitted imaging order information and that is necessary to obtain the X-ray image. Examples of the information necessary to obtain the X-ray image include the type (upright type, lying type, portable type, etc.) of the X-ray detection apparatus to be used, the orientation (imaging area, direction, etc.) of a patient, and X-ray imaging conditions (tube voltage, tube current, presence or absence of a grid, etc.). The operator of the X-ray diagnostic apparatus makes settings for the X-ray diagnostic apparatus and performs positioning of the patient based on these pieces of information, and then presses an X-ray irradiation switch. The image obtaining unit 101 then obtains an X-ray image.

In this case, the operator interprets the type of the X-ray detection apparatus to be used and the X-ray imaging conditions based on the received imaging order information, and makes settings for the image obtaining unit 101. In some embodiments, an image obtaining control unit 113 controls the image obtaining unit 101 so that the consistency determination is performed before X-ray irradiation and the X-ray irradiation is prevented from being performed in a state of inconsistency caused by the operator's interpretation error. In other words, the image obtaining control unit 113 corresponds to an example of an image obtaining control unit configured to control the image obtaining unit not to obtain an image if there is inconsistency between the imaging order information and the type of the image obtaining unit and parameter settings. Alternatively, the image obtaining control unit 113 controls the image obtaining unit 101 to interpret, receive, and automatically set the type of the X-ray detection apparatus and X-ray imaging conditions based on the imaging order information before X-ray irradiation. In other words, the image obtaining control unit 113 corresponds to an example of the image obtaining control unit configured to perform control related to the type of the image obtaining unit and parameter settings based on the imaging order information.

In step S202, the consistency determination unit 107 determines consistency between the X-ray image obtained by the image obtaining unit 101 and the imaging order information. In this case, the consistency determination unit 107 is configured to perform determination processing using an inference model (inference unit 108) that is obtained by machine learning and includes updatable parameters.

In other words, the consistency determination unit 107 corresponds to an example of the determination unit configured to determine consistency between the imaging order information and the medical image using a parameter obtained by machine learning.

For example, if the orientation of a patient is set as a consistency determination processing target, data is supplied to the X-ray diagnostic apparatus as X-ray image data only after image obtaining using X-ray irradiation, unlike the case where the type of the X-ray detection apparatus and X-ray imaging conditions are consistency determination processing targets. In the consistency determination unit 107, when X-ray image data is input, the inference unit 108 is preliminarily subjected to machine learning to infer the orientation (imaging area, direction, etc.) of the patient. Because X-ray images of various patients with various orientations are input and outputs need to meet various demands from the operator, the inference unit 108 can use an inference device that is obtained by deep learning and uses an automatically designed feature amount instead of a manually designed feature amount. In other words, the consistency determination unit 107 can include the inference unit 108 that has been subjected to learning processing using a deep learning algorithm to output an inference processing result about consistency between the medical image received as input and the imaging order information.

In a configuration in which the image obtaining control unit 113 is omitted, consistency determination processing and control processing by the image obtaining unit 101 before X-ray irradiation cannot be performed, so that the type of the X-ray detection apparatus and X-ray imaging conditions are to be determined based on X-ray image data. In this case, the consistency determination unit 107 performs the consistency determination processing. However, the method for consistency determination processing is not limited to deep learning. The consistency determination unit 107 can also perform the consistency determination processing by, for example, including the type of the X-ray detection apparatus to be used and X-ray imaging conditions in X-ray image data as additional information and using the comparison unit 109 that simply compares the additional information with information interpreted based on the imaging order information. In other words, additional information may be added to a medical image, and the consistency determination unit 107 may determine consistency between imaging order information and the medical image by comparing the additional information with the imaging order information. Instead of adding additional information to X-ray image data, the consistency determination processing can also be performed using an image analysis unit 114 that performs analysis processing based on a rule-based analysis technique using a contrast of the X-ray image, an intensity of a pixel value and a specific frequency spectrum that substitute the X-ray imaging conditions, such as a tube voltage, a tube current, and information indicating the presence or absence of a grid. In other words, the consistency determination unit 107 may determine consistency between imaging order information and a medical image by analyzing the medical image using a rule-based technique. An inference model can also be obtained by machine learning. Which one of the above-described methods is to be employed can be determined depending on the cost, performance, necessity of updating by machine learning, or the like. For example, the consistency determination unit 107 may be configured by a combination of the comparison unit 109 for the type of the X-ray detection apparatus, the inference unit 108 for the orientation of the patient, and the image analysis unit 114 for X-ray imaging conditions. In other words, the consistency determination unit 107 can change the determination method based on the consistency determination processing target.

Figure 3:
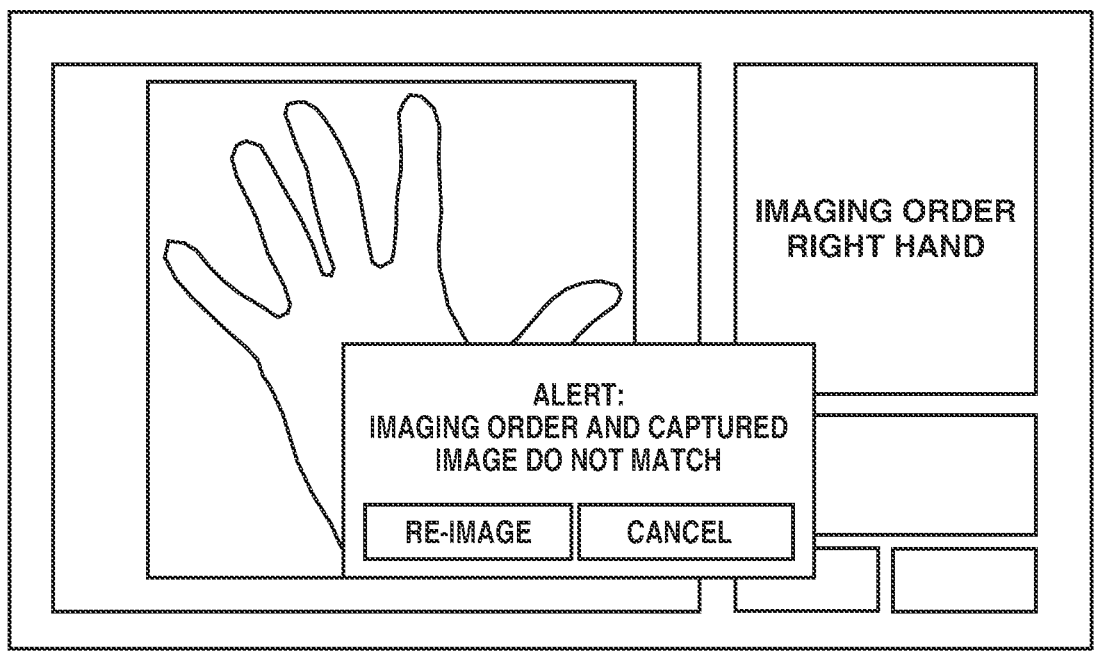
FIG. 3 illustrates a display example on a display unit according to the first exemplary embodiment.

In step S203, the display unit 106 displays the X-ray image obtained by the image obtaining unit 101, the determination result output from the consistency determination unit 107, or an instruction for the operator that is based on the determination result. For example, if the determination result indicates consistency between the imaging order information and the obtained X-ray image, only the X-ray image is to be displayed. However, if the determination result indicates that there is inconsistency between the imaging order information and the obtained X-ray image, the X-ray image, the imaging order information, and the determination result are to be displayed, and an instruction for the operator is also to be displayed to ask the operator to perform re-imaging, as illustrated in FIG. 3.

Also, a more detailed inference processing result may be displayed. Specifically, the display unit 106 can display the determination result output from the determination unit for each of a plurality of different items.

Figure 4:
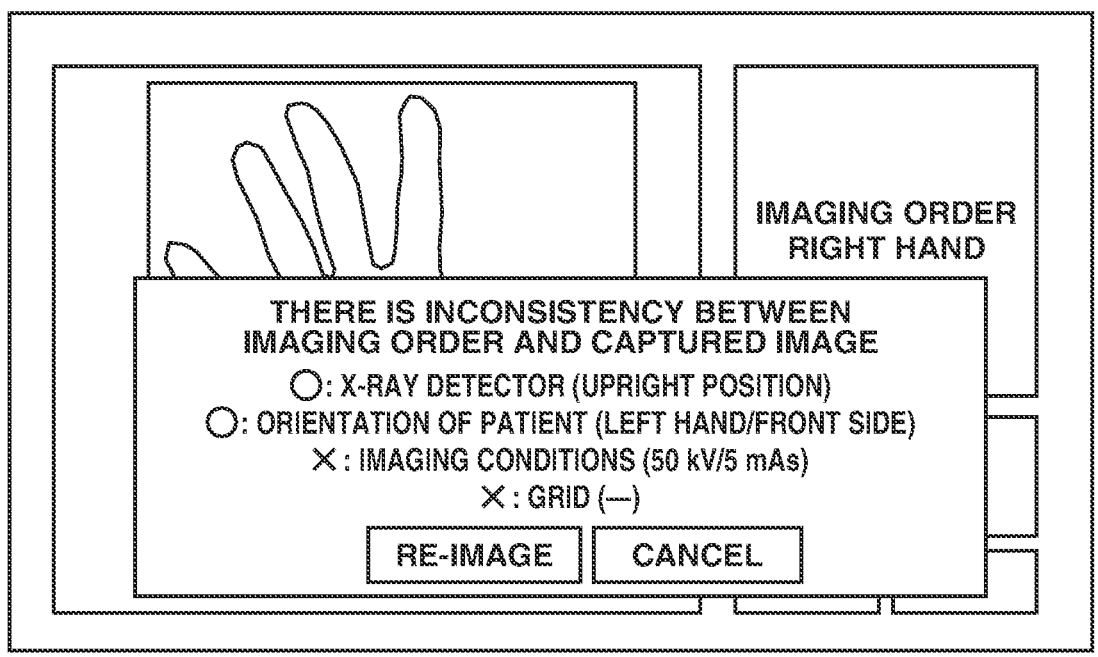
FIG. 4 illustrates a display example on the display unit according to the first exemplary embodiment.

For example, the inference processing result can indicate that the type of the X-ray detection apparatus and the orientation (imaging area, direction, etc.) of the patient in the imaging order information are correct, while the X-ray imaging conditions are incorrect as illustrated in FIG. 4. Displaying such a detailed inference processing result allows the operator to determine, for example, that, if the patient's orientation that needs to reliably satisfy the consistency in terms of diagnosis is correct, the errors in the X-ray imaging conditions can be allowed as long as the diagnostic performance can be maintained. It also allows the operator to determine that X-ray imaging conditions adjusted on the spot can be used more suitably than the X-ray imaging conditions instructed in the order depending on the body type or the like of the patient.

Further, a consistency determination item may be added depending on a target area. Specifically, the consistency determination unit 107 can perform the consistency determination processing on a plurality of different items depending on an imaging area of a medical image. For example, in a chest image, the items can include an item indicating whether the size of an X-ray detector to be used is sufficiently large to depict the entire area of a lung field, and an item indicating whether positioning of the imaging area is accurately performed. For another example, in an order for obtaining an image of a finger bone fracture or the like, an item indicating whether the right and left sides of an imaged area are correct and an item indicating whether a region of interest is located at a desired position can be set as determination items.

The medical image processing apparatus 100 executes a series of processing as described above.

According to the present exemplary embodiment described above, the consistency between imaging order information and a medical image obtained based on the imaging order information can be accurately determined.

Figure 5:
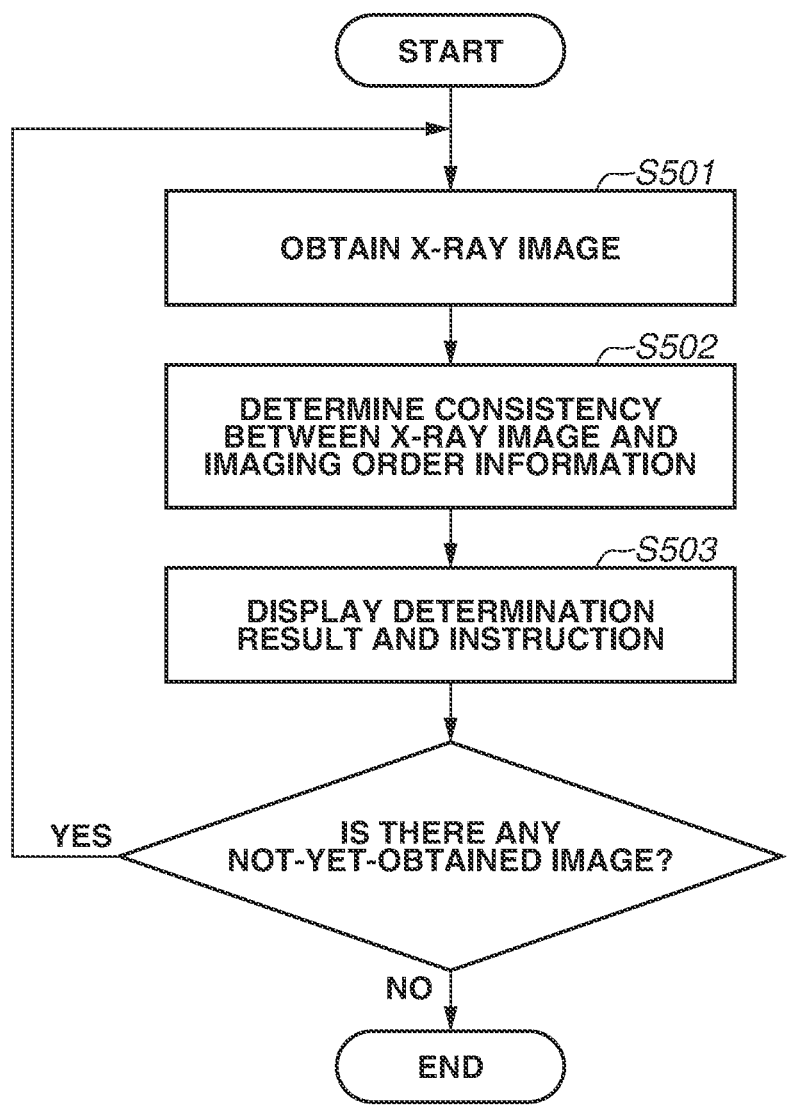
FIG. 5 is a flowchart illustrating a processing procedure according to a second exemplary embodiment.

As a second exemplary embodiment, a description will be given of a case where imaging management processing is performed using consistency determination processing when a plurality of times of image capturing using the X-ray diagnostic apparatus is instructed in imaging order information, with reference to FIG. 5. This corresponds to an imaging support function, for example, in the case of imaging with a plurality of orientations in one imaging order, such as X-ray imaging of four limbs, or in the case of changing an imaging sequence flexibly depending on the state of a patient. Even when imaging is performed while changing the imaging sequence, the patient's orientations at which images have been obtained can be recognized by performing consistency determination processing on the obtained images, and patient's orientations at which images have not been obtained yet are presented via the display unit 106 to thereby support the operator.

Processing Flow

In step S501, the image obtaining unit 101 obtains an X-ray image based on information that is derived from the transmitted imaging order information and used to obtain the X-ray image. Examples of the information used to obtain the X-ray image include the type (upright type, lying type, portable type, etc.) of the X-ray detection apparatus to be used, the orientation (imaging area, direction, etc.) of a patient, and X-ray imaging conditions (tube voltage, tube current, presence or absence of a grid, etc.). The operator of the X-ray diagnostic apparatus makes settings for the X-ray detection apparatus and performs positioning of the patient based on these pieces of information, and then presses the X-ray irradiation switch. The image obtaining unit 101 then obtains an X-ray image.

In this case, the imaging order information instructs to obtain a plurality of images, such as images of a front surface and a side surface of the chest of the patient, and the operator of the X-ray diagnostic apparatus determines an imaging operation to be subsequently performed from among the imaging operations that have not been performed yet flexibly depending on the state of the patient.

In step S502, the consistency determination unit 107 determines consistency between the X-ray image obtained by the image obtaining unit 101 and the imaging order information. In this case, the determination by the consistency determination unit 107 includes determination using the inference model (inference unit 108) that is obtained by machine learning and can be updated, which is the most characteristic configuration in the present exemplary embodiment.

In the present exemplary embodiment, for example, when the imaging order information instructs to obtain two images, i.e., images of the front surface and the side surface of the chest, it is determined which one of the front surface and the side surface the X-ray image currently obtained by the image obtaining unit 101 corresponds to. Specifically, the consistency determination unit 107 inputs X-ray image data to the inference unit 108, and the inference unit 108 outputs an inference processing result indicating which one of the front surface and the side surface of the chest corresponds to the input X-ray image data. Specifically, if the imaging order information includes an order for obtaining a plurality of images, the consistency determination unit 107 can determine which one of the plurality of images corresponds to the medical image obtained by the image obtaining unit. The inference unit 108 is obtained in advance by machine learning. Because the imaging instruction in imaging order information varies depending on the hospital where the medical image processing apparatus 100 is used, the inference unit 108 can include parameters obtained by deep learning instead of using the rule-based technique.

Figure 6:
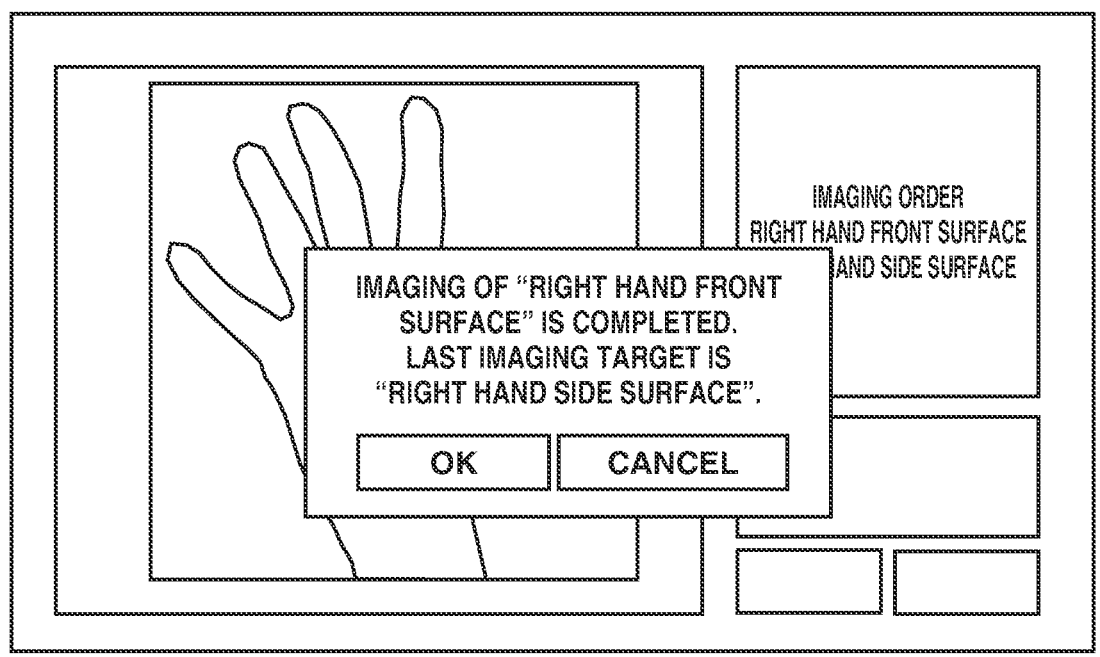
FIG. 6 illustrates a display example on a display unit according to the second exemplary embodiment.

In step S503, the display unit 106 displays the X-ray image obtained by the image obtaining unit 101, the determination result output from the consistency determination unit 107, and the instruction for the operator that is based on the determination result. For example, if the determination result indicates that one of a plurality of imaging operations requested in the imaging order information has been carried out, an instruction to obtain a not-yet-obtained image is displayed as illustrated in FIG. 6. In other words, if the imaging order information includes an order for obtaining a plurality of images, the display unit 106 can display an instruction to obtain a not-yet-obtained image among the plurality of images requested in the order, based on an output from the determination unit.

The above-described processing is repeatedly performed until all the images requested in the imaging order information are obtained, thereby making it possible to prevent imaging with the same orientation and prevent omission of some of imaging operations. This leads to an improvement in workflow.

Figure 7:
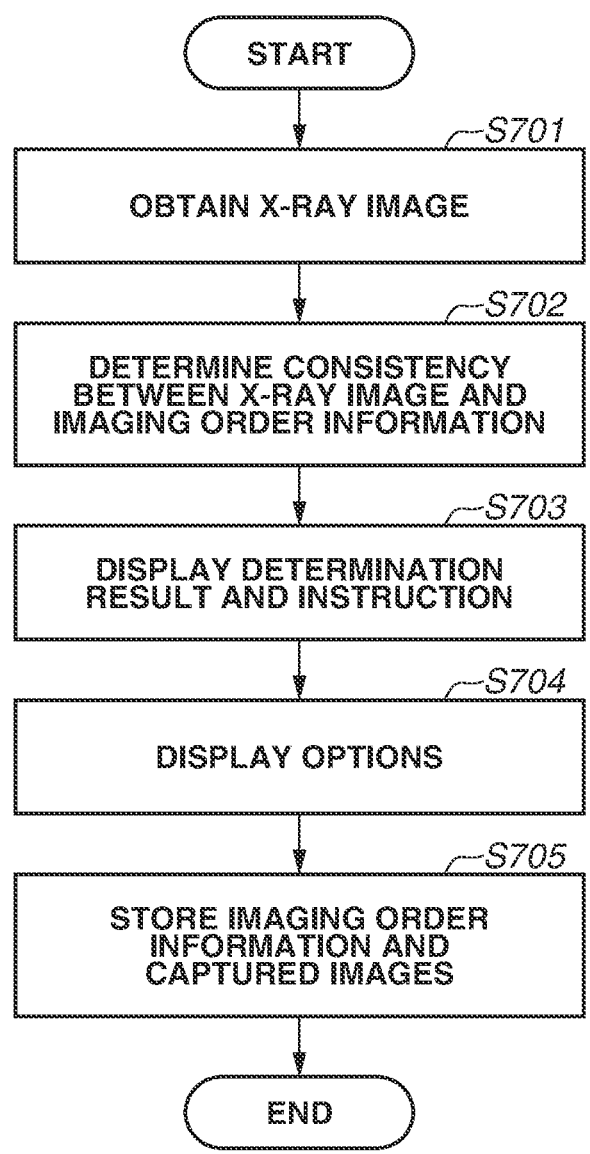
FIG. 7 is a flowchart illustrating a processing procedure according to a third exemplary embodiment.

As a third exemplary embodiment, a description will be given of a case where X-ray imaging is performed based on imaging order information using the X-ray diagnostic apparatus and the obtained X-ray image and imaging order information are stored as data for learning or data for verification according to the consistency determination result, with reference to FIG. 7.

Processing Flow

In step S701, the image obtaining unit 101 obtains an X-ray image based on information that is derived from the transmitted imaging order information and used to obtain the X-ray image. Examples of the information used to obtain the X-ray image include the type (upright type, lying type, portable type, etc.) of the X-ray detection apparatus to be used, the orientation (imaging area, direction, etc.) of a patient, and X-ray imaging conditions (tube voltage, tube current, presence or absence of a grid, etc.). The operator of the X-ray diagnostic apparatus makes settings for the X-ray diagnostic apparatus and performs positioning of the patient based on these pieces of information, and then presses the X-ray irradiation switch. The image obtaining unit 101 then obtains an X-ray image.

In step S702, the consistency determination unit 107 determines consistency between the X-ray image obtained by the image obtaining unit 101 and the imaging order information. In this case, the determination by the consistency determination unit 107 includes determination using the inference model (inference unit 108) that is obtained by machine learning and can be updated, which is the most characteristic configuration in the present exemplary embodiment.

In step S703, the display unit 106 displays the X-ray image obtained by the image obtaining unit 101, the determination result output from the consistency determination unit 107, or the instruction for the operator that is based on the determination result. For example, if the determination result indicates consistency between the imaging order information and the obtained X-ray image, only the X-ray image is to be displayed. However, if the determination result indicates that there is inconsistency between the imaging order information and the obtained X-ray image, the X-ray image, the imaging order information and the determination result are to be displayed, and a re-imaging instruction for the operator is to be also displayed.

Figure 8:
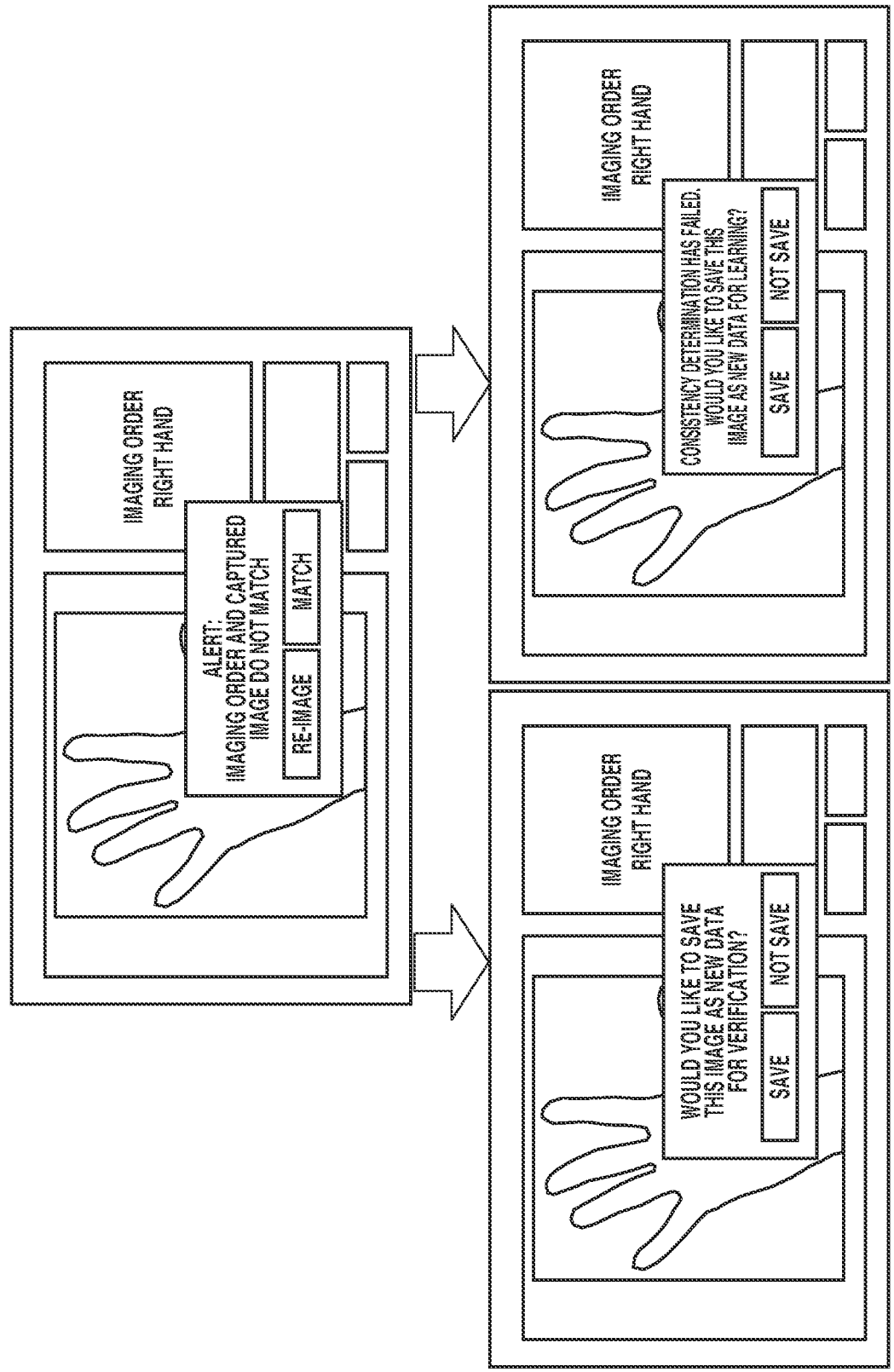
FIG. 8 illustrates a display example on a display unit according to the third exemplary embodiment.

In step S704, the display unit 106 displays an option to accept a user operation regarding storage, specifically regarding whether to store the imaging order information together with the X-ray image as data for learning or data for verification in the storage unit 103, as illustrated in FIG. 8.

Assume that the option displayed here varies depending on the determination result output from the consistency determination unit 107. The displayed options includes an option "re-image" for the case where the determination result indicates that the imaging order information does not match the captured image and an option "match" for the case where the determination result is different and the imaging order matches the captured image. The case where "the determination result is different" corresponds to a case where the inference unit 108 included in the consistency determination unit 107 has failed to correctly perform inference processing on the currently input image. In other words, this image and the imaging order information including a correct answer can be provided as data for learning to the inference unit 108. Accordingly, when the option "match" is selected, the display can transition to a screen for confirming the operator's intention to store this image as data for learning. Even in a situation where the option "re-image" is selected, that is, even when the determination result is correct, it can be assumed that the operator desires to store the imaging order information and the image as data for verification. In this case, when the option "re-image" is selected, the display may transition to a screen for confirming the operator's intention to store this image as data for verification. In other words, the display unit 106 can display an option to receive an input from the operator regarding storage of the imaging order information and the medical image based on the determination result output from the determination unit. Further, the display unit 106 can display information indicating that the imaging order information and the medical image are sorted as data for learning in a case where the determination result output from the determination unit is incorrect. If the determination result is correct, the display unit 106 can display information indicating that the imaging order information and the medical image are sorted as data for verification. Further, the storage unit 103 can sort and store the imaging order information and the medical image as data for learning or data for verification according to an input from the operator via the operation unit.

The above-described screen transition that occurs every time imaging is performed is troublesome for the operator and leads to a reduction in working efficiency. Therefore, it may be desirable to automatically sort and store the imaging order information and the medical image as data "for verification" or data "for learning" after selecting the option "re-image" or "match", without displaying the screen for confirming the operator's intention. Alternatively, the screen transition may be performed at a preset frequency, for example, once every ten times. In other words, the display unit 106 can display a screen for receiving an operation to store the imaging order information and the medical image at a predetermined frequency.

Also, in the case of automatically sorting and storing the imaging order information and the medical image as data "for verification" or data "for learning", for example, the imaging order information and the medical image can be sorted into data "for verification" and data "for learning" at a ratio of 9:1 when the option "re-image" is selected, and the imaging order information and the medical image can be sorted into data "for verification" and data "for learning" at a ratio of 1:9, for example, when the option "match" is selected. It is desirable to make the sorting ratio adjustable by the hospital or the operator. The storage unit 103 can store the sorted imaging order information and medical image while sorting the imaging order information and the medical image into data for learning and data for verification at a predetermined ratio.

In step S705, the storage unit 103 sorts and stores the imaging order information and the captured image as data "for verification" or data "for learning" based on the option selected via the operation unit 105. As described above, if the order information is different from the consistency determination result, the image is desirably registered as an image for learning. However, since data "for verification" is needed, it is desirable to make the sorting ratio settable at an adjustable ratio instead of registering all the images as data "for learning".

If all data on, for example, chest images that are captured at a high frequency is stored, the data occupies a large part of the storage capacity of the storage unit 103. Therefore, it is desirable to make the storage ratio adjustable for each area. Specifically, data on an area where the imaging frequency is high is to be stored once every ten times, and all data is to be store stored with respect to an area where the imaging frequency is low. In other words, the data control unit 112 can set, for each imaging area of a medical image, the frequency of displaying the screen for receiving an operation regarding storage in the storage unit 103, or the sorting ratio at which the imaging order information and the medical image are sorted as data for learning or data for verification.

Further, since imaging based on the imaging order information varies with time according to the level of proficiency, new data can be used as data for learning and data for verification. Accordingly, the data stored in the storage unit 103 is discarded in sequence from the oldest data so as to prevent the data from occupying the storage capacity.

Furthermore, it is desirable to provide a mechanism for deleting inappropriate data for use in learning, for example, data obtained during test-imaging or data obtained when imaging has failed, because such inappropriate data may deteriorate the performance of the inference unit 108 in the learning process.

Figure 9:
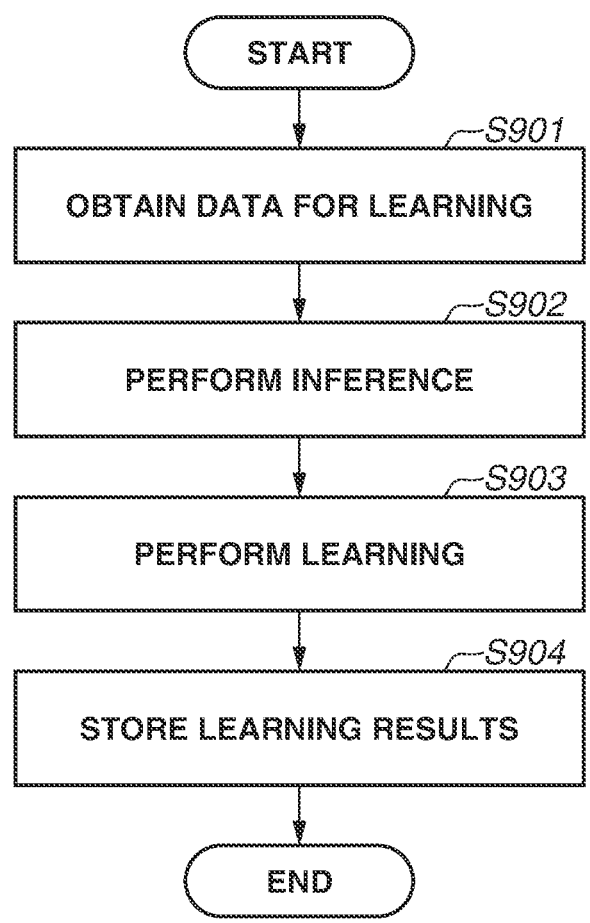
FIG. 9 is a flowchart illustrating a processing procedure according to a fourth exemplary embodiment.

As a fourth exemplary embodiment, a description will be given of learning processing to obtain a new parameter for the inference unit 108 included in the consistency determination unit 107 using an X-ray image and imaging order information stored as data for learning in the storage unit 103 with reference to FIG. 9.

Processing Flow

In step S901, the data control unit 112 obtains an X-ray image and imaging order information stored as data for learning in the storage unit 103. If the orientation (imaging area, direction, etc.) of the patient is set as an inference processing target of the inference unit 108, the imaging order information used here is label information indicating the orientation of a patient.

In step S902, the inference unit 108 performs inference processing using the X-ray image obtained by the data control unit 112 as input and outputs an inference processing result.

In step S903, the learning unit 110 calculates a loss and updates parameters for the inference unit 108 based on back propagation using the inference processing result output from the consistency determination unit 107 and the label information obtained from the storage unit 103. This promotes optimization of the inference process by the inference unit 108 such that the inference unit 108 infers the label appended to the input image.

In step S904, the data control unit 112 repeatedly performs the above-described learning step a predetermined number of times for a predetermined number of pieces of data at a predetermined timing, and stores the results in the storage unit 103 as new parameter candidates constituting the inference unit 108. In other words, the data control unit 112 corresponds to an example of a data control unit that stores parameters that are updated using the imaging order information and the medical image obtained as data for learning from the storage unit, as new parameter candidates for the determination unit.

Examples of the predetermined timing include a timing when new data for learning is stored in the storage unit 103, a timing when a predetermined number of pieces of data for learning are accumulated, and a timing outside the reception hours in a hospital when the X-ray diagnostic apparatus is not used in clinical practice. The predetermined number of pieces of data and the predetermined number of times are generally determined depending on the type of a learning algorithm to be used and calculation resources to be operated, and are not particularly limited.

According to the present exemplary embodiment, the inference unit 108 can be updated by machine learning using the obtained image and the imaging order information. It is intended to improve the accuracy of the inference unit 108 by employing the configuration of the inference unit 108 that can be customized to perform desired inference processing for individual operated facilities, instead of implementing the inference unit 108 that is configured in advance to perform inference processing on any type of inference target. The inference unit 108 can be updated by additional learning so that recognition, classification, regression, and the like in the inference unit 108 can be optimized for rules determined based on an examination target and workflow for individual facilities, thereby making it possible to construct a system that can be improved as much as the system is used depending on the characteristics of individual facilities.

Verification and Update

As a fifth exemplary embodiment, a description will be given of a case where the performance of a new inference parameter candidate is verified and the inference unit 108 is updated with reference to FIG. 10.

Processing Flow

In step S1001, the data control unit 112 obtains an X-ray image and imaging order information stored as data for verification stored in the storage unit 103. In a case where the orientation (imaging area, direction, etc.) of the patient is set as an inference processing target of the inference unit 108, the imaging order information used here is label information indicating the orientation of a patient specifically.

In step S1002, the inference unit 108 performs inference processing using the X-ray image obtained by the data control unit 112 as input and outputs an inference processing result.

In step S1003, the verification unit 111 evaluates the inference accuracy using the inference processing result output from the consistency determination unit 107 and the label information obtained from the storage unit 103. The above-described steps are repeatedly performed on the data stored as data for verification in the storage unit 103, and the inference accuracy is calculated as the performance of an inference parameter candidate.

In step S1004, the data control unit 112 calculates the above-described inference accuracy at a timing when a new parameter candidate constituting the inference unit 108 is stored in the storage unit 103, and updates the inference unit 108 with the new parameter candidate if the inference accuracy is more than a predetermined value. In other words, the data control unit 112 can select a parameter from among new parameter candidates based on the evaluation result of the inference accuracy calculated by the verification unit, and can update the determination unit using the selected parameter.

The predetermined value is, for example, the inference accuracy obtained when steps S1001 to S1003 are performed on the inference unit 108 before updating. In this case, it is possible to implement the inference unit 108 that is automatically updated when the performance of a new parameter candidate that is higher than the performance of the currently used parameter can be achieved.

Alternatively, the above-described operation of the data control unit 112 may be performed when the operator issues an instruction to carry out the operation via the operation unit 105. In this case, the inference accuracy of the new parameter candidate is presented to the operator via the display unit 106, and the operator determines whether to perform updating based on the inference accuracy. If the operator determines to perform updating, the operator updates the inference unit 108 via the operation unit 105. This makes it possible to safely update the inference unit 108 based on the determination by the operator.

Alternatively, the apparatus can be configured to perform control based on determination by a manufacturer of the apparatus instead of determination by the operator.

In this case, a service engineer collects data, performs learning at the manufacturer, verification, and introduction of new parameter candidates in a hospital. Alternatively, a cloud technology can be desirably used so as to execute data collection via a network, verification on the cloud, and updating based on an instruction remotely issued by the manufacturer.

It may also be desirable to store and manage the parameter candidates and update history, and if a problem occurs, the data is to be immediately restored to the original state before updating. This makes it possible to safely update the inference unit 108.

Various Modifications and Changes

While exemplary embodiments have been described above, some embodiments are not limited to the above-described exemplary embodiments. Various modifications and changes can be made within the scope of the disclosure.

The medical image processing apparatus according to any one of the exemplary embodiments described above may be implemented as a single apparatus, or may be configured to execute the above-described processing using a combination of a plurality of apparatuses that are communicably connected to each other. These configurations are also included in the exemplary embodiments of the present disclosure. The above-described processing may be executed by a common server apparatus or a server group. The plurality of apparatuses constituting the medical image processing apparatus can be configured to communicate with each other at a predetermined communication rate, and are not required to be located within the same facilities or the same country.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-162902, which was filed on Oct. 1, 2021 and which is hereby incorporated by reference herein in its entirety.

What is claimed is:

1. A medical image processing apparatus comprising:
at least one processor; and
a memory coupled to the at least one processor, the memory having instructions that, when executed by the at least one processor, cause the at least one processor to function as:
an obtaining unit configured to obtain a medical image based on imaging order information;
a determination unit configured to determine, using an inference model including parameters obtained by machine learning, consistency between an orientation included in the imaging order information and an orientation inferred from the medical image, and
in a case where the consistency determination by the determination unit and a consistency determination by an operator are different, additional learning of the inference model is performed using the medical image.

2. The medical image processing apparatus according to claim 1, further comprising a control unit configured to control the obtaining unit not to obtain the medical image in a case where there is inconsistency between the imaging order information and settings for the parameters related to a type of the medical image and obtaining of the medical image.

3. The medical image processing apparatus according to claim 2, wherein the control unit performs control related to the type of the medical image and the settings for the parameters based on the imaging order information.

4. The medical image processing apparatus according to claim 1, wherein, using the medical image as an input, the determination unit selects, based on a consistency determination target, any one of a plurality of determination methods including at least a determination method that uses the parameters obtained using a deep learning algorithm, the plurality of determination methods including at least one of a determination method that compares the imaging order information and additional information added to the medical image and a determination method that analyzes the medical image using a rule-based technique.

5. The medical image processing apparatus according to claim 1, further comprising a display control unit configured to cause a display unit to display a determination result of the consistency,
wherein the determination unit determines the consistency on a plurality of different items based on an imaging area of the medical image, and
wherein the display control unit causes the display unit to display a determination result of the consistency for each of the plurality of different items.

6. The medical image processing apparatus according to claim 1, further comprising a display control unit configured to cause a display unit to display an instruction for an operator based on a determination result of the consistency,
wherein in a case where the imaging order information includes an order for obtaining a plurality of medical images, the determination unit determines which one of the plurality of medical images corresponds to the medical image obtained by the obtaining unit, and
wherein the display control unit causes the display unit to display an instruction to obtain a not-yet-obtained image among the plurality of medical images.

7. The medical image processing apparatus according to claim 1, further comprising:
a storage unit configured to store the imaging order information and the medical image; and
an operation unit configured to receive an input from an operator,
wherein the imaging order information and the medical image are sorted into data for learning and data for verification according to the input from the operator via the operation unit, and the sorted imaging order information and medical image are stored in the storage unit.

8. The medical image processing apparatus according to claim 7, further comprising a control unit configured to control display for receiving an operation regarding the storage at predetermined frequency.

9. The medical image processing apparatus according to claim 8, wherein the control unit is configured to control the imaging order information and the medical image to be stored in the storage unit by sorting the imaging order information and the medical image into data for learning and data for verification at a predetermined ratio, is configured to set, for each imaging area of the medical image, a frequency at which the display for receiving the operation regarding storage in the storage unit is performed and a ratio at which the imaging order information and the medical image are sorted into data for learning and data for verification, or is configured to store, into the storage unit, the parameters updated with the imaging order information and the medical image for learning obtained from the storage unit as new parameter candidates.

10. The medical image processing apparatus according to claim 9, further comprising a verification unit configured to evaluate an accuracy of determination made by the determination unit including the new parameter candidates,
   wherein the control unit stores, into the storage unit, the new parameter candidates for the determination unit and a determination accuracy evaluation result of the verification unit using the imaging order information and the medical image for verification obtained from the storage unit.

11. The medical image processing apparatus according to claim 10, wherein the control unit selects a parameter from among the new parameter candidates based on the determination accuracy evaluation result of the verification unit, and updates the determination unit with the selected parameter.

12. The medical image processing apparatus according to claim 10, wherein the control unit selects a parameter from among the new parameter candidates based on an instruction issued by an operator via the operation unit, and updates the determination unit with the selected parameter.

13. The medical image processing apparatus according to claim 1, further comprising a display control unit configured to cause a display unit to display an option to receive an input from an operator regarding storage of the imaging order information and the medical image, based on a determination result from the determination unit.

14. The medical image processing apparatus according to claim 13, wherein the display control unit causes the display unit to display information indicating that the imaging order information and the medical image are sorted as data for learning in a case where the determination result from the determination unit is incorrect and the imaging order information and the medical image are sorted as data for verification in a case where the determination result from the determination unit is correct.

15. The medical image processing apparatus according to claim 1, further comprising:
   a display control unit configured to cause a display unit to display a determination result from the determination unit; and
   a control unit configured to receive an input from an operator regarding storage of the imaging order information and the medical image to update the parameters by machine learning.

16. The medical image processing apparatus according to claim 1, wherein the imaging order information is a unit of information about an examination ordered by a doctor, and includes at least one of patient information, a date and time of imaging, a designated examination method, and an area, a direction, and an orientation of an imaging target based on doctor's findings.

17. A medical image processing method comprising:
   obtaining a medical image based on imaging order information;
   determining, using an inference model including parameters obtained by machine learning, consistency between an orientation included in the imaging order information and an orientation inferred from the medical image; and
   in a case where the consistency determined using the inference model and a consistency determined by an operator are different, performing additional learning of the inference model using the medical image.

18. A non-transitory computer-readable storage medium storing instructions for causing a computer to execute a method comprising:
   obtaining a medical image based on imaging order information;
   determining, using an inference model including parameters obtained by machine learning, consistency between an orientation included in the imaging order information and an orientation inferred from the medical image; and
   in a case where the consistency determined using the inference model and a consistency determined by an operator are different, performing additional learning of the inference model using the medical image.

* * * * *